United States Patent [19]

Juan et al.

[11] Patent Number: 4,457,339
[45] Date of Patent: Jul. 3, 1984

[54] MULTIPROGRAMMABLE PINCH VALVE MODULE

[75] Inventors: Juan J. S. Juan, Madrid; Vincente M. Valentin, Majadahonda, both of Spain

[73] Assignee: Coulter Electronics, Inc., Hialeah, Fla.

[21] Appl. No.: 354,171

[22] Filed: Mar. 3, 1982

[51] Int. Cl.$^3$ ............................................ F16K 31/524
[52] U.S. Cl. ............................. 137/624.16; 137/624.2; 251/6; 251/7
[58] Field of Search ............... 137/624.16, 624.17, 137/624.2; 251/6, 7, 251

[56] References Cited

FOREIGN PATENT DOCUMENTS 1750119 1/1973 Fed. Rep. of Germany .......... 251/6
1340081 12/1973 United Kingdom ................ 251/6

*Primary Examiner*—Alan Cohan
*Attorney, Agent, or Firm*—Silverman, Cass & Singer, Ltd.

[57] ABSTRACT

A pinch valve module comprising a housing, a cylindrical cavity formed in the housing, plural passageways leading from the cavity to the exterior of the housing and spaced about the cavity and a coaxial rotor rotatable within said cavity. The rotor has a diameter less than the diameter of the cavity defining a chamber between its outer wall and the inner cavity wall. Plural spaced pins are located within the chamber and are spaced about the rotor periphery. The rotor has unitary outwardly extending radial protrusions in the form of lobes extending into the chamber. Generally cylindrical tubular rollers or rings are loosely seated about selected ones of said pins within the chamber. Flexible conduits are threaded through said passageways and are disposed along arcuate sections of the chamber walls between the pins and the chamber wall. A stepping motor is coupled to said rotor to translate the lobes past the rings forcing selected ones of the rings against the flexible conduit to pinch same preventing fluid passage therethrough. The valve is programmable by prepositioning the pins and the rings placed thereon. Where rings are absent, no compression is exerted on the conduit. The rotor has an exposed outer disc surface carrying plural spaced arrays of recesses cooperative with microswitches or the like which can control functional operation of the testing system with which the module is associated.

10 Claims, 6 Drawing Figures

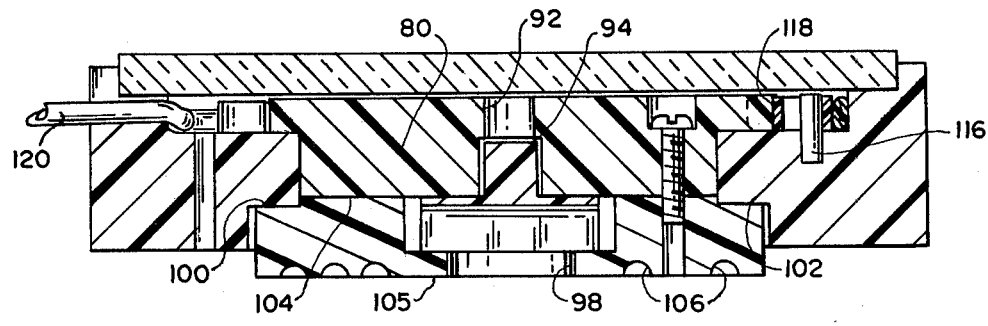
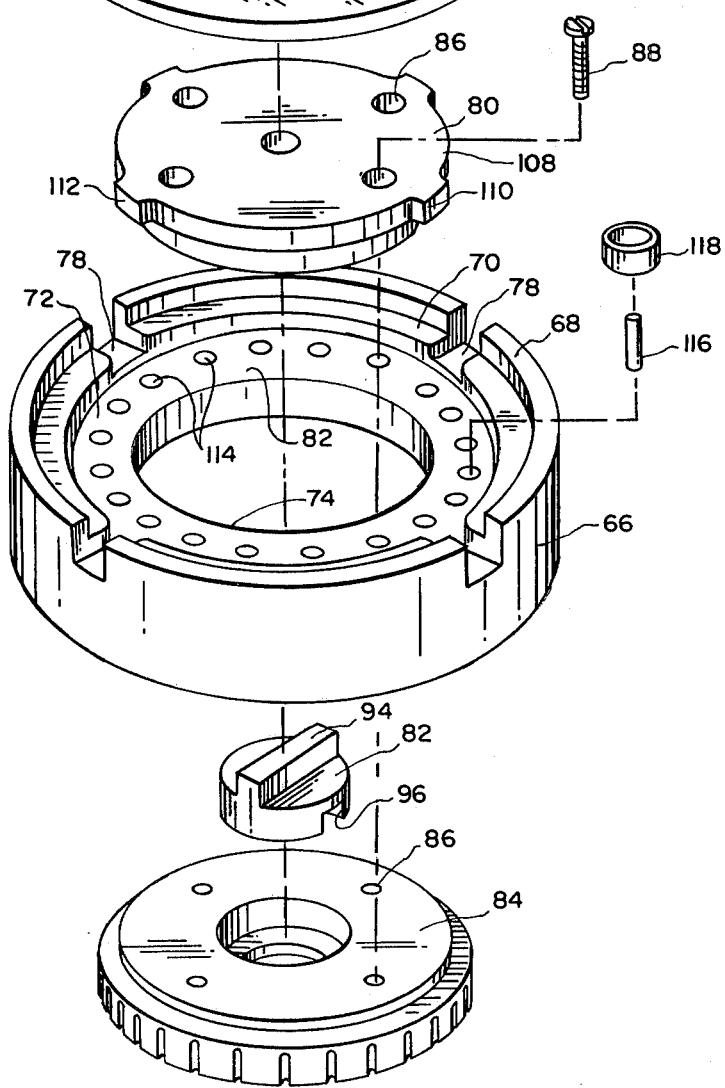

MULTIPROGRAMMABLE PINCH VALVE MODULE

BACKGROUND OF THE INVENTION

This invention relates generally to means for controlling the transfer of fluids through flexible conduits defining flow paths and particularly provides a pinch valve module which is capable of operating upon a plurality of flexible conduits in preprogrammed sequence and which may be combined with like valves to enable control of flow through an extensive array of flexible conduits.

Apparatus intended for the conduct of a plurality of chemical tests automatically upon a series of individual samples fed to the apparatus are well known to the art. Such automated analysis apparatus is utilized in the medical, biological and industrial fields for obtaining diagnostic and routine information for empirical, control and even research purposes. Problems which had been encountered in manually conducted tests gave rise to automated, or at least semi-automated, testing apparatus.

One considerable problem encountered in manually operated and in automated apparatus has involved minimal efficiency of earlier fluid transfer, i.e. liquid transfer, in such a manner as to provide quantitatively accurate dilutions and satisfactory physical transfer from one testing location to another without appreciable loss of precision, accuracy and the fluid itself. Another persistent problem has been encountered in switching from one fluid source to another. Fluid valves, such as check valves, have been used to control the direction of flow as well as the timing of such flow. Often, valves are employed which operate upon the flow of fluid through flexible conduit by pinching or compressing the conduit.

Valves such as disclosed and claimed in U.S. Pat. Nos. 8,882,899 and 3,932,065 have been successfully offered as solutions to the many problems encountered such as achievement of precision and accuracy in effecting transfer of fluids from one location to another with achievement of accuracy and precision. Sealing and/or seating problems previously encountered perhaps may have been caused by sediment buildup on the sealing mechanism. Lack of quick responsiveness and leakage were the result. Mechanical hysteresis or backlash caused by time delay in achieving operating in an opening and closing of the valve gave rise to lag in the reaction time between initial operation of the valve and the actual achievement of such action. Backlash allows additional fluid to pass causing error in volume dispensed. Backlash is unpredictable being due somewhat to back pressure applied to the valve to cause the valve to close, for example.

Many analytical systems require many individual fluid paths to be monitored and further, provide a plurality of flexible fluid conduit to effect and to define flow paths for transferring fluids for both delivery and control of other functions as well as for the performance of testing procedures. Pinch valves had to be provided for each of the flow paths, along with their solenoid drivers and controls, the valves functioning as check valves, flow control valves or the like.

It would be more advantageous both for economy and for efficient space utilization, to reduce the number of pinch valves needed and improved their efficiency. Further, if operation of these valves could be simplified so that they could be present without expensive controls, much advantage would result. Improved vesatility, if achievable, would also be of advantage. Modular valve arrays are desirable.

It would be highly advantageous to provide a pinch valve module capable of being functionally preprogrammed for automatic sequentially timed operation further capable of being computer interfaced.

If the valve module could be provided with means whereby the position of the valving means thereof could control the sequential operation of the testing apparatus, for example, considerable advantage could ensue.

SUMMARY OF THE INVENTION

The invention provides a multiprogrammable pinch valve which includes means for threading a plurality of individual flexible conduits through a valve body, means for acting upon each of these flexible conduits in a programmed manner to change the condition thereof between permitting and preventing passage of fluids therethrough, cam and removable floating follower means individual to each flexible conduit capable of being prepositioned in a variable program of operation by simple manipulations placement and number of the follower means and operable by a simple stepping motor between various conditions and further capable of being ganged in arrays for operation by common drive means. Additionally, means are provided enabling the valve to control the sequential operations of the testing apparatus associated therewith.

BRIEF DESCRIPTION OF THE DRAWINGS

FIG. 5 is an enlarged sectional view taken along lines 5—5 of FIG. 4, and

FIG. 6 is an exploded view of the pinch valve module of FIG. 2.

DESCRIPTION OF PREFERRED EMBODIMENT

The invention provides generally a single pinch valve module having multifunctional capability, that is, it is capable of operating upon a plurality of individual lines defined by flexible tubing to control flow along many different flow paths. Hence, the pinch valve of the invention can be substituted for a number of individual conventional pinch valves such as employed in fluid transfer systems for analytical systems requiring such fluid transfer.

Figure 1:
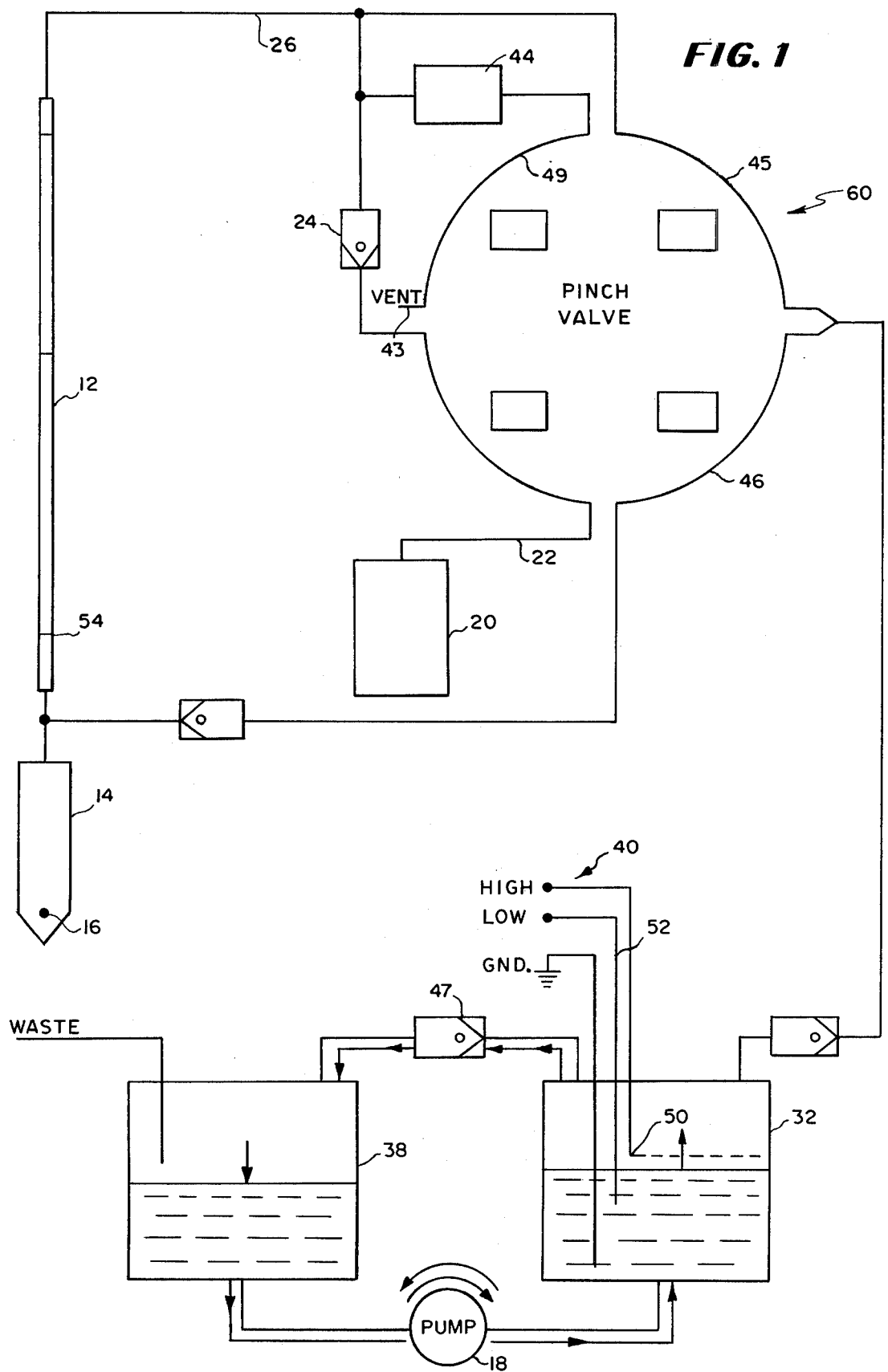
FIG. 1 is a diagrammatic representation of a pneumatically operated fluid transfer system for moving fluids in an analytical system, the pinch valve module according to the invention shown employed therein.
Figure 2:
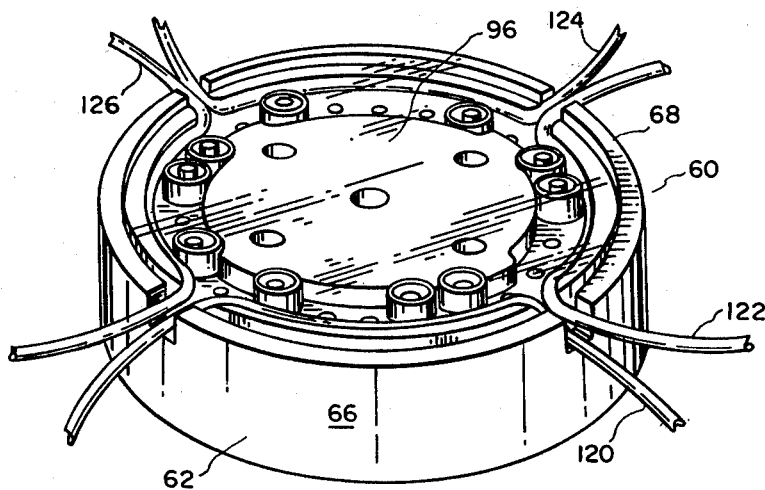
FIG. 2 is a perspective view of a pinch valve module constructed in accordance with the invention.

As described herein the single pinch valve module 10 can be substituted for four separate conventional pinch valves and their solenoid drivers in the pneumatic/vacuum operated system shown in FIG. 1.

The analytical system 10 within which the pinch valve module 60 is incorporated includes a measuring tube 12 arranged to measure the volume of test fluid delivered to scanning vessel 14 preferably of the Coulter type carrying a scanning aperture 16 through which a given known volume of particles in liquid system in suspension is passed. A pump 18 is provided for controlling fluid flow through the system. A cleaner container 20 for holding rinse fluid is coupled by way of line 22 and through a check valve 24 to line 26 leading to the measuring tube 12. At the initial stage, all conduits in the valve module are open, the initial pressure and volume being set.

Employing the system 10, a given volume of particulate sample in liquid suspension as measured in measuring tube 12 is delivered to the scanning vessel 14 and passed through the scanning aperture 16 monitored in accordance with a method of particle study such as described in U.S. Pat Nos. 2,656,508, 3,549,994 and others. This fluid passes along line 45. Vacuum is employed to draw a predetermined volume of sample through the scanning aperture 16. Pressurized fluid, air, is employed to rinse the measuring tube 12, passing through line 22 and returning through line 46. The measuring tube 12 is cleaned, the cleaner container 20 drained and the measuring tube 12 dried by pressurized fluid, air. The last step is the draining of the full system 10 via line 49 wherein all the liquid is directed to the vacuum chamber 38 and the system 10 is ready again for a new run.

During the setting of the initial pressure and volume, the pump 18 operates to force liquid from the waste vessel 38 to the vacuum vessel 32 until the level of liquid therein reaches the high level electrode 50 of the level sensor 40, there being a vent 43 to the atmosphere through the check valve 47 and waste vessel 38, the pressure within said vessel 38 being atmospheric pressure.

After a selected period of time, the pump 18 starts and sends liquid from the vacuum vessel 32 to the waste vessel 38 until the level falls below the low level detector 52. The vacuum level is set by the amount of liquid sent from the vacuum vessel 32 to the waste vessel 38.

At the same time, vacuum is applied to scanning vessel 14 to start sample aspiration. Air is aspirated from the expanding chamber 44 to remove small droplets of liquid from the measuring tube 12, if any are present.

A constant flow of sample is directed through the scanning aperture 16 after vacuum is stabilized. This period of time can be electronically controlled The pinch valve 60 is rotated and vacuum is applied to the upper end of measuring tube 12. The sample is aspirated through the scanning aperture when the sample reaches the start contact 54.

Now the rinse cycle begins, with cleaner from chamber 20 being aspirated through the measuring tube 12. Thereafter, air transported through the vent 43 passing through the measuring tube 12 drains the cleaner chamber 20 and dries the tube 12.

The last operation is the draining of the full system 10 by returning to the initial condition with release of the vacuum and all liquid being directed back to the vacuum vessel 32.

At the initial stage for setting initial pressure and volume, all lines, 22, 49, 45 and 46 (FIG. 1) are open. When vacuum is set, only line 46 is open.

The orifice tube 14 is drained with only line 46 open, other lines 22,49,45 being closed.

During "counting" all lines but 45 are closed. Rinsing involves opening of lines 22 and 46 with lines 49, 45 closed. Draining and drying involves opening lines 49 and 46, with lines 22 and 45 closed.

Final draining involves opening of all valves, the pump 18 deenergized and air being drawn through all open conduits 49, 45 and 46. Conduit 22 is open but does not occur therethrough.

Now, attention is directed to the construction of the valve 70 which includes a housing 62 comprising a body of generally cylindrical configuration having a circumferential wall 66, a top wall 68, a shelf 70, a cavity 72 and a coaxial through passage 74 through the body 64 to accomodate rotor 76. The cavity 72 includes four radial extensions 78, each extending through the circumferential wall 66 and opening exterior of the housing 62.

The cam rotor 76 is seated in central passage 74 coaxial therewith. The cam rotor 76 comprises a cam disc 80, a drive key 82 and programming disc 84. The cam rotor 76 and the programming disc 84 are provided with threaded passageways 86 for accomodating screws 88. The rear face 90 of the cam disc 80 has an outwardly opening elongate recess 92 for accomodating the key 94 of drive key 82, key 82 also being formed with a cross slot 96 for receiving an actuator 83 (shown in FIG. 3) for rotating the assembled rotor 96.

The programming disc has a concentric portion 98 for receipt within the passage 74 and a circumferential recess 100 for seating upon rear shelf 102 formed in the body 64 and engaged sealingly upon the rear face 104 of the cam disc 80. The outer face 105 of programming disc 84 is provided with a plurality of recesses or indentations 106 disposed in groups about its central axis. The recesses or indentations 106 function as programming means cooperative with arrays of micro-switches for controlling the functional operation of the system within which the module 10 operationally is installed.

The cam disc 80 includes a peripheral lip 108 carrying the radial lobes 110 which are arranged symmetrically disposed about the periphery of said disc 80, each of the lobes 110 terminating in cam-like surfaces 112. The lobes 110 extend into the chamber defined between the cam disc 80 and the shelf 70.

The lip of cam disc 80 of rotor 76 seats on the floor of cavity 72 with the lobes 110 radially extending just short of the pins 116. Hollow cylindrical rings or rollers 118 are seated loosely over the selected ones of the pins 116 and function as cam followers. The rings 118 are formed of a slightly resilient plastic material, such as Nylon or Teflon (registered trademaker of DuPont Co.).

The radial outwardly extending lobes 110 are capable of engaging the rollers 118 as the cam surfaces 112 pass same during rotation of rotor 76, thereby shifting their axial position on the pins 110. The shelf 70 is divided into arcuate sections between the wall 106 of extensions 78 of cavity 72 with same arranged so that when flexible tubing 120 is threaded along the recess facing wall of shelf 70, after entering through one of the cavity extensions 78 along the shelf wall to be directed through a next adjacent radial extension to a destination. When a ring 118, urged by the cam surface 112 of lobe 110, engages the flexible tubing 120 during the course of rotation of the rotor 76, the flexible tubing is compressed to close off flow therethrough. The timing as well as the length of time during which the tube is compressed or pinched depends upon the number and location of the rollers 118 on pins 116. Top cover 119 is snugly fitted over the valve body to complete the assembly.

Figure 3:
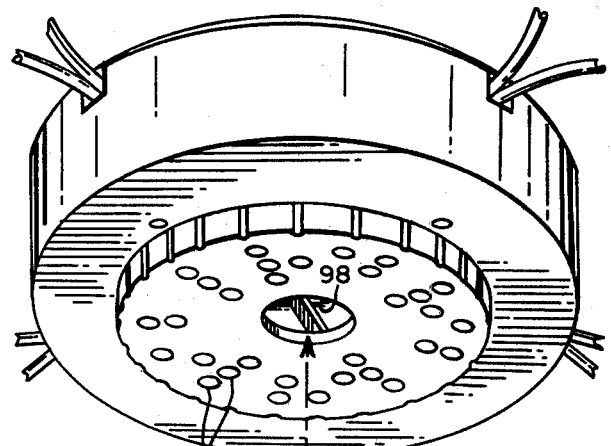
FIG. 3 is a bottom view, in perspective of the pinch valve module shown in FIG. 2, shown cooperatively associated with actuating means therefor.
Figure 4:
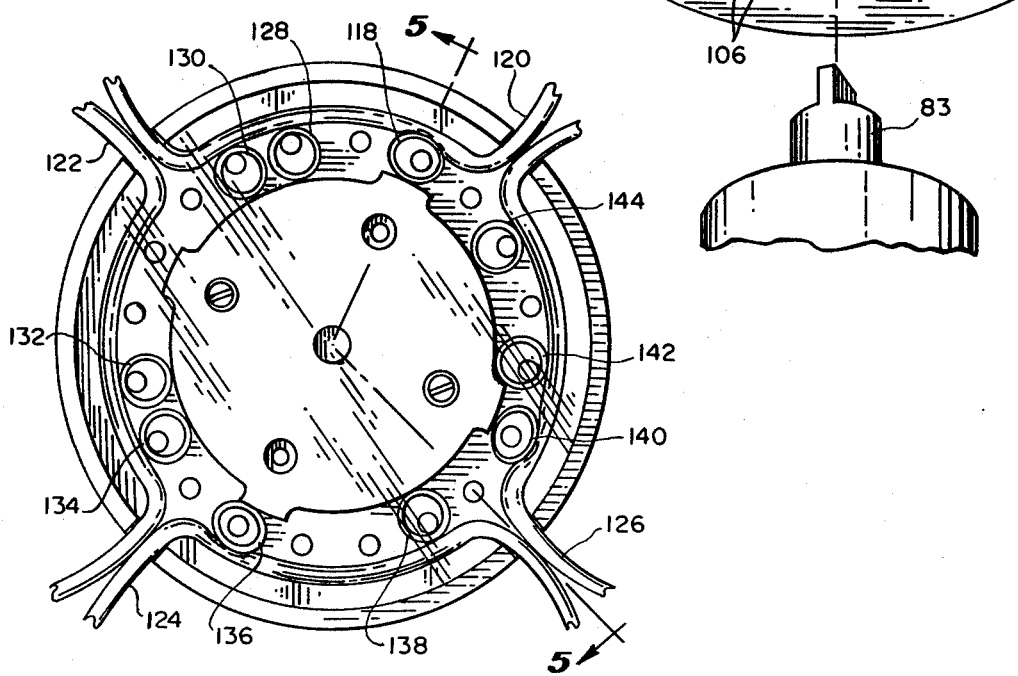
FIG. 4 is a top plan view of the pinch valve module of FIG. 2.

In FIG. 4, the pinch valve module 60 is illustrated in one of its operational conditions. Four flexible tubes, 120, 122, 124 and 126 are shown threaded through the respective radial extensions of cavity 72. The path taken by flexible tube 120 passes ring 118, ring 128 and ring 130. The path taken by flexible tube 124 passes only rings 136 and 138, while the path taken by flexible tube 126 passes rings 140, 142 and 144. In the condition illustrated in FIG. 3, the rotor 76 is positioned so that the respective cam surfaces are engaged with rings 118, 136 and 140 compressing tubes 120, 124 and 126 so that only the fluid line represented by tube 122 is open and flow is allowed therethrough.

Assuming that operation of the pinch valve module 60 is effected by causing the rotor 76 to rotate in a counter-clockwise direction (arrow), the stepped movement of said rotor one step in the counter-clockwise direction causes the cam surfaces to impress only upon ring 142. This results in opening flexible tube 120 and 124, leaving tube 122 open and tube 126 closed. The next stepped movement one step counter-clockwise causes the cam surfaces to impact upon rings 132, 128 while moving to a location where no ring is mounted upon a pin 116 to effect lines 124 and 126. Thus flexible tubes 124 and 126 are open while flexible tubes 120 and 122 are pinched closed. When the cam surfaces 112 engage the rings, i.e. 118, the rings are shifted laterally and slightly compressed compared to the condition of such rings as represented by rings 128 and 130 in FIG. 4, for example.

Referring to FIG. 3, the indentations 106 in the surface 105 of disc 84 arrayed in groups along radial lines taken through their centers and passing through the center axis of the rotor 76. Arranged singly or in rows of two or three indentations, they will cause the opening or closing of suitably biased microswitch actuators (not shown) proximate to the drive means 83, said microswitches effecting the functional control of the testing apparatus with which the valve module 60 is associated. Obviously, the indentations or recesses can comprise, instead, protrusions also operative upon suitable microswitch actuators.

The pinch valve module 10 herein described replaces four conventional pinch valves. It should be understood that a single module could replace as many as eight separate pinch valves or check valves, as eight flexible tubes can be accomodated in the present structure. Further, the single module could be combined with additional modules in gangs or stacks, driven off the same simple motor, which can be stepped progressively by a conventional timer motor. The roller 100 could be arranged so that the operation could be of the break-before-make or make-before-break modes.

In both the standby and the fill modes, all the tubing is in the open condition. The four-lobed cam operates upon the four separate tubes as if they were separate valves.

If one section, i.e. the arcuate wall section, of the cavity, has six rolling position, pins 116 and only the first and fourth positions need contain rings such as ring 118. The tubing will be closed off during the first and fourth phases of the cycles performed, and open during the other phases.

Variations are capable of being made without departing from the spirit or scope of the invention as defined in the attached claims.

What is desired to secure by Letters Patent of the United States is:

1. A pinch valve module comprising means for defining plural paths for plural flexible conduits, multiple cam and follower means operable selectively upon ones of said flexible conduits alternatively to compress and to release same, means defining an annular path for said cam means proximate to said flexible conduits and said follower means mounted at selected locations along the annular path of said cam means and drivable thereby against portions of said flexible conduits to compress same during passage of said cam means along said annular path and means for driving said cam means, and pins are disposed along said path, selected ones of said pins mounting said followers means being located at the same radial distance from the center of said annular path.

2. The module as claimed in claim 1, said housing having an annular cavity formed therein,
a rotor seated for rotation within said cavity and defining said chamber with the wall of said cavity, said cavity having a floor and an annular wall and said pin means are seated on said floor spaced from said annular wall at selected locations about said cavity,
said cam means being carried by said rotor and comprise outwardly extending lobe means disposed for translation along an annular portion of said chamber between said rotor and said pin means, for engaging said cam follower means where present.

3. The module as claimed in claim 1, said cam follower means comprising tubular rings having a diameter greater than said ones of the pin means.

4. The module as claimed in claim 2, said pin means comprising pin members arranged at selected locations along an annular path on the floor of said cavity, said pin members extending axially parallel to the rotor axis, and said cam follower means comprise generally cylindrical rings having a diameter greater than said pins and less than the width of said chamber, said rings being engageable by said cam means whereby to displace same toward the wall of said chamber for compressing any flexible conduit present at that location disposed along said wall.

5. The module as claimed in claim 1, there are plural arcuate spaced chamber wall sections between said passageway means, said flexible conduit being accomodated through one passageway along said wall section to and through a passageway adjacent thereto.

6. The module as claimed in claim 1, said drive means comprising a drive shaft mounting said rotor and a drive motor coupled to said drive shaft, means for coupling said drive motor with said rotor.

7. The module as claimed in claim 6, timer motor means coupled to said drive motor.

8. The module as claimed in claim 2 wherein recess means formed in the floor of the cavity defining a plurality of positions along a circular path within the chamber and said pin means comprise pins seated in selected ones of said recesses and extending along axes parallel with the rotor axis and said cam follower means comprise shallow tubular rollers seated loosely on selected ones of said pins, said cam means being intercepted by said rollers and displaced toward the wall of said chamber against any flexible conduit extending therealong to compress same closed, the positioning of said rollers on said pins being determinant of the condition of portion of any said flexible conduit disposed between said rollers and the wall of said cavity.

9. The module as claimed in claim 3 wherein said rings have a limited resilience.

10. The module as claimed in claim 2 in which said rotor has switch actuator means arranged in a predetermined pattern and capable of operating upon switch means presented thereto in a predetermined program of operation.

* * * * *